United States Patent [19]

Pegg

[11] 4,069,627
[45] Jan. 24, 1978

[54] BUILDING STRUCTURE

[76] Inventor: Owen Christopher Pegg, R.R. #1, Grafton, Ontario, Canada, K0K 2G0

[21] Appl. No.: 671,162

[22] Filed: Mar. 29, 1976

[30] Foreign Application Priority Data

Mar. 27, 1975 Canada .................................. 223578

[51] Int. Cl.² ............................................. E04B 7/04
[52] U.S. Cl. ........................................ 52/92; 52/90; 52/226; 52/282; 52/291; 52/401; 52/656
[58] Field of Search ................. 52/241, 225, 222, 226, 52/656, 693, 488, 231, 240, 401, 282, 92, 90, 475, 489, 289, 291, 638; 47/17

[56] References Cited

U.S. PATENT DOCUMENTS

| 1,262,301 | 4/1918 | Blest | 52/291 X |
|---|---|---|---|
| 1,819,970 | 8/1931 | Peden | 52/92 |
| 2,037,889 | 4/1936 | Doud | 52/475 |
| 2,270,161 | 1/1942 | Briggs | 52/92 |
| 3,096,861 | 7/1963 | Frick et al. | 52/241 |
| 3,101,817 | 8/1963 | Radek | 52/241 |
| 3,150,463 | 9/1964 | Nearing et al. | 47/17 X |
| 3,281,998 | 11/1966 | Honold et al. | 52/90 X |
| 3,452,498 | 7/1969 | Kinsey | 52/90 X |
| 3,579,943 | 5/1971 | Tam | 52/475 X |
| 3,616,588 | 11/1971 | Hansson | 52/495 |
| 3,733,755 | 5/1973 | Butler | 52/241 X |
| 3,798,853 | 3/1974 | Castle | 52/92 |

FOREIGN PATENT DOCUMENTS 4,935 of 1898 United Kingdom .................. 52/291

Primary Examiner—Leslie Braun

[57] ABSTRACT

A greenhouse comprises a frame structure including base rails, eaves rails and a ridge rail. Upright wall posts extend into openings in the base rails and the eaves rails so that interengagement of those members prevents movement of the posts in either horizontal direction. Additionally, the ends of a transverse flange on such wall posts are received in notches in elongated lips on the base rail and eaves rail to limit pivotal movement of the wall structure until it is locked into its final position by the use of diagonal bracing members including length-adjusting mechanisms which, when moved into their locked positions, clamp the structural wall members in a unique predetermined angular orientation so ensuring ease of glazing. The roof sections are similarly constructed and novel one-piece eaves rails and a novel ridge rail further facilitate asssembly. The corner posts of the greenhouse serve to lock the side and end base rails together.

11 Claims, 16 Drawing Figures

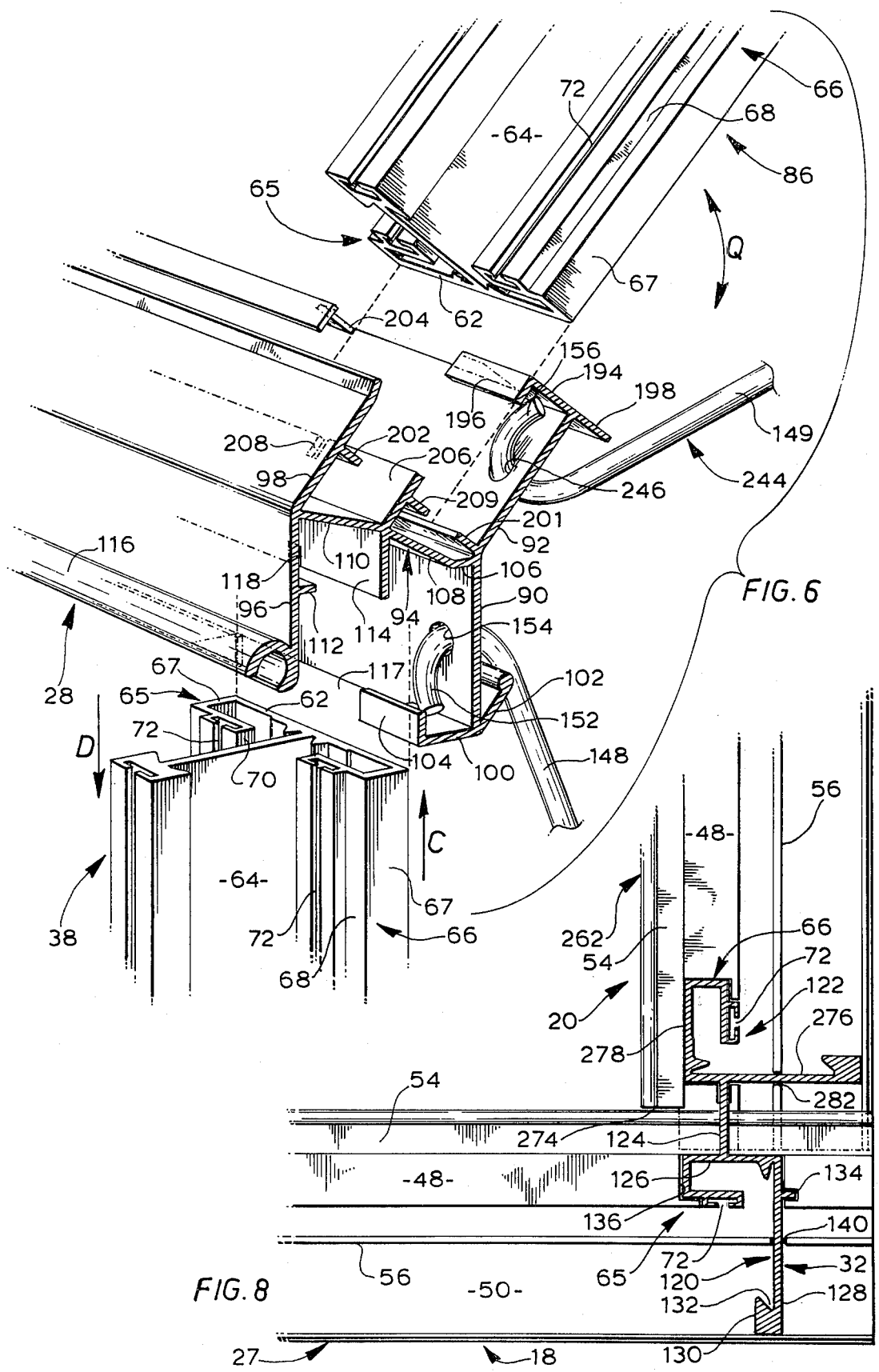

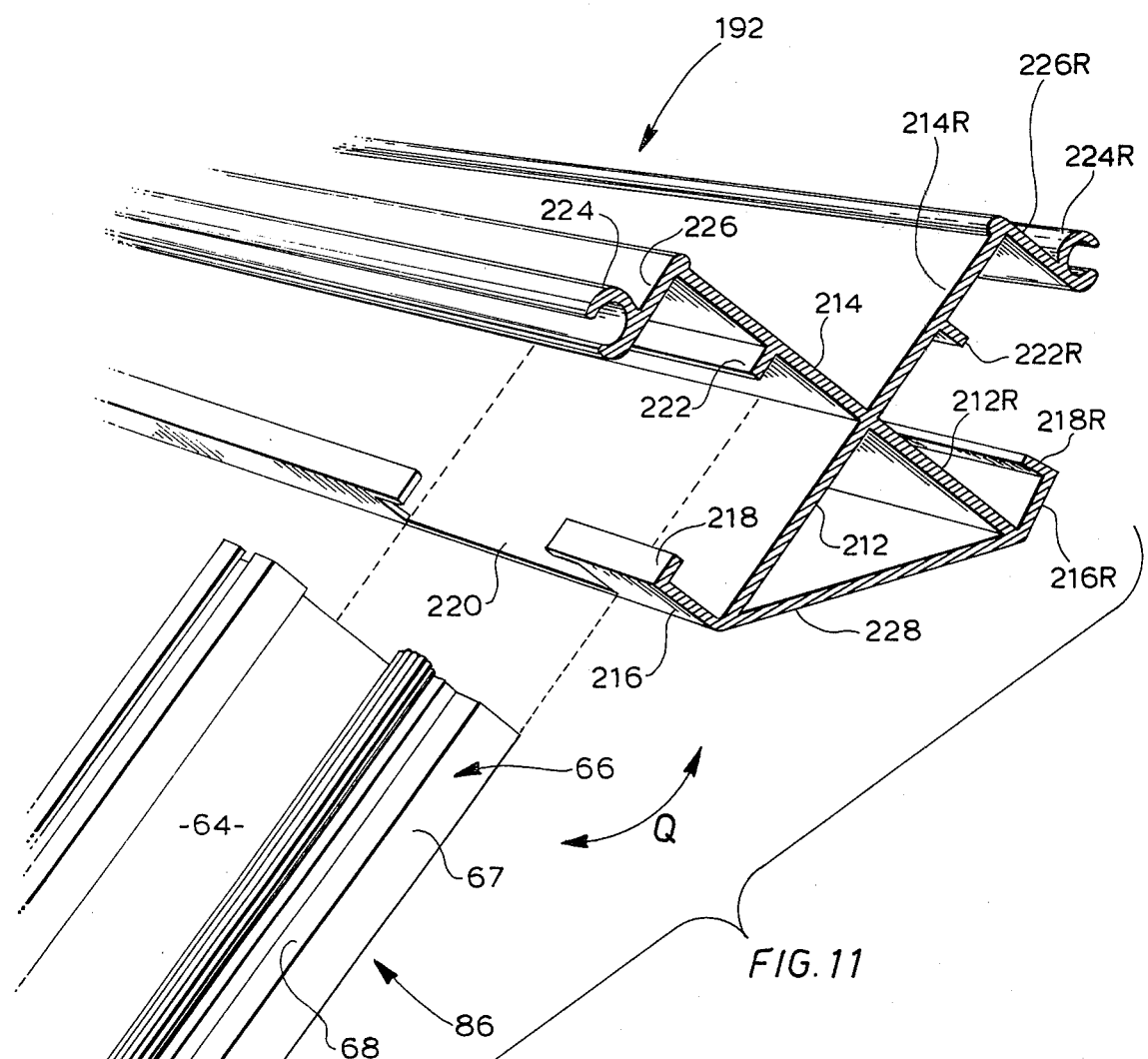
FIG. 11
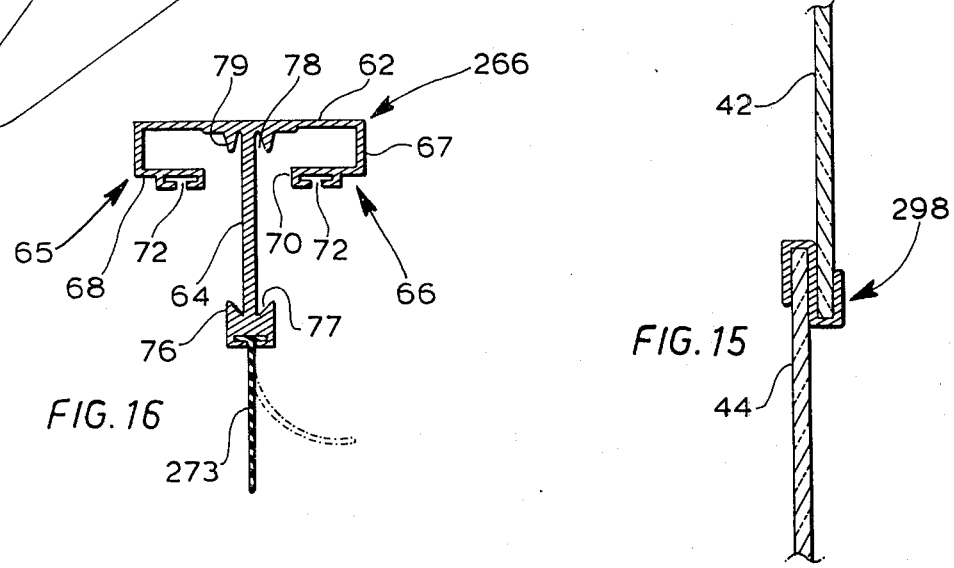
FIG. 16
FIG. 15

BUILDING STRUCTURE

BACKGROUND OF THE INVENTION

The present invention relates to building structures and more particularly to building structures which are especially suited for use in the construction of greenhouses.

Greenhouses which have frames constructed using structural frame members in the form of elongated aluminum extrusions are already known but such known greenhouses have presented certain serious practical disadvantages.

In the first place, many such known greenhouses have been difficult to assemble, calling for the use of a considerable number of nuts and bolts or other fastening devices.

Other such known greenhouses have presented the difficulty that prolonged adjustment of tensioning devices, such as turnbuckles, is necessary to square the frame structure to allow it to be safely glazed.

It is a principal object of this invention to provide building structures which present several important practical advantages especially when utilized in the construction of greenhouses and when compared to previously known structures.

It is a further important object of this invention to provide a building structure in the form of a greenhouse which is more easily assembled and erected.

Other objects of the invention will become apparent as the description herein proceeds.

SUMMARY OF THE INVENTION

In accordance with one feature of this invention, there is provided a building structure which comprises a pair of elongated, mutually spaced apart, and essentially rigid rails; a pair of elongated, mutually spaced apart and essentially rigid cross members extending longitudinally between and terminally abutting said rails so as then to prevent movement of said rails toward each other and so as to form at least one generally planar frame having a principal plane, said rails and said cross members slidably interfitting so as essentially to prevent movement of the ends of said cross members both in the longitudinal directions of said rails and transversely relative to said principal plane of said frame; and at least one generally diagonally extending bracing member terminally connected to said frame so as to retain said rails and said cross members in their interfitting assembled configuration and to secure said rails and said cross members in a predetermined mutual angular orientation.

In accordance with another feature of this invention, there is provided a building structure which comprises a first elongated and essentially rigid rail comprising a web and integrally formed therewith inner and outer flanges projecting transversely from said web; a second and essentially rigid rail generally parallel to said first rail, mutually spaced apart therefrom in a first principal plane containing said web of said first rail and in turn comprising a first web disposed in said first principal plane; first inner and outer flanges integrally formed with said first web and projecting transversely therefrom; a second web integrally formed with said first web and disposed in a second principal plane angularly disposed with respect to said first principal plane; and second inner and outer flanges integrally formed with said second web and projecting transversely therefrom; a third elongated and essentially rigid rail generally parallel to said second rail, spaced apart therefrom in said second principal plane and in turn comprising a web disposed in said second principal plane and integrally formed therewith inner and outer flanges projecting transversely from said web; a first pair of elongated, mutually spaced and essentially rigid cross members each comprising a base and extending between said first and second rails generally in said first principal plane and being slidably received in openings provided in said inner flange of said first rail and in said first inner flange of said second rail and terminally abutting said outer flange of said first rail and said first outer flange of said second rail so as essentially to prevent movement of said first and second rails toward each other and movement of the ends of said cross members of said first pair both in the longitudinal direction of said first and second rails and transversely relative to said first principal plane; a second pair of elongated, mutually spaced and essentially rigid cross members each comprising a base and extending between said second and third rails generally in said second principal plane and being slidably received in openings provided in said inner flange of said third rail and in said second inner flange of said second rail and terminally abutting said outer flange of said third rail and said second outer flange of said second rail so as essentially to prevent movement of said second and third rails toward each other and movement of the ends of said cross members of said second pair both in the longitudinal direction of said second and third rails and transversely relative to said second principal plane; at least one generally diagonally extending bracing member terminally connected to said first and second rails to maintain those rails and said first pair of cross members in interfitting assembled configuration in a predetermined angular orientation; and at least one generally diagonally extending bracing member terminally connected to said second and third rails to maintain those rails and said second pair of cross members in interfitting assembled configuration in a predetermined angular orientation.

Yet a further feature of this invention involves the provision of a building structure which comprises a pair of elongated, mutually spaced and essentially rigid rails; a pair of elongated, mutually spaced and essentially rigid cross members extending longitudinally between, interconnecting and terminally abutting said rails so as to form a generally planar frame having a principal plane; and at least one generally diagonally extending bracing member terminally connected to said frame and including a length-adjusting mechanism having locked and released positions whereby, after assembly of said rails, said cross members and said bracing member, the length of said bracing member can be reduced to a unique predetermined value by moving said length-adjusting mechanism into its locked position so as then to adjust said rails and said cross members into a unique predetermined mutual angular orientation and then to maintain them in such orientation.

Furthermore, the present invention provides a building structure which comprises an elongated side rail having a wall with inner and outer faces and first and second flanges projecting outwardly from said wall; and elongated end rail having a wall with inner and outer faces and first and second flanges projecting outwardly from said wall of said end rail; and an elongated corner post having mutually spaced apart longitudinal end projections extending through openings in said first flanges of respective ones of said side and end rails to abut said second flanges of such side and end rails, whereby interengagement of said side and end rails with said corner post restricts not only longitudinal movement of the end of said corner post beyond said second flanges of said side and end rails but also movement of either of said side and end rails in their longitudinal directions.

Other features of the invention and the advantages presented thereby will become apparent as the description herein proceeds.

BRIEF DESCRIPTION OF THE DRAWINGS

The invention will now be described merely by way of illustration with reference to the accompanying drawings in which:

FIG. 4 is a fragmentary horizontal sectional view when taken as indicated by the arrows 4—4 of FIG. 3 but showing two panes of glass;

FIG. 5 is a fragmentary vertical sectional view when taken as indicated by the arrows 5—5 of FIG. 4;

FIG. 6 is an exploded and fragmentary perspective view showing an upright post, an eaves rail and a roof bar of the greenhouse shown in FIG. 1 at the position indicated at 6 in that figure;

FIG. 8 is a fragmentary horizontal sectional view when taken as indicated by the arrows 8—8 of FIG. 7 but showing the two base rails and the corner post in their assembled configuration and omitting two bracing rods shown in the former figure;

FIG. 11 is an exploded and fragmentary perspective view showing a roof bar and a ridge rail of the greenhouse shown in FIG. 1 at the position indicated at 11 in that figure;

FIG. 15 is a fragmentary vertical sectional view when taken as indicated by the arrows 15—15 of FIG. 1 and showing one pane-supporting clip used in the greenhouse of that figure; and FIG. 16 is a horizontal sectional view through one of two upright posts defining a doorway of the greenhouse shown in FIG. 1 and showing the useful provision of a weather seal on that post.

DESCRIPTION OF THE PREFERRED EMBODIEMENT

Reference will first be made in FIG. 1 in which there is generally indicated at 16 one embodiment of a greenhouse incorporating building structures as provided by the present invention. The greenhouse 16 comprises two essentially identical side walls one of which is generally indicated at 18 and the other of which is not shown so as to simplify FIG. 1. Additionally, the greenhouse 16 comprises a front end wall, that front end wall being generally indicated at 20 and having mounted thereon a sliding door generally indicated at 22. To simplify FIG. 1, the opposite end wall is not shown but it is to be noted that that end wall can be identical to the front end wall 20 or, if desired, can be formed without a sliding door.

Figure 1:
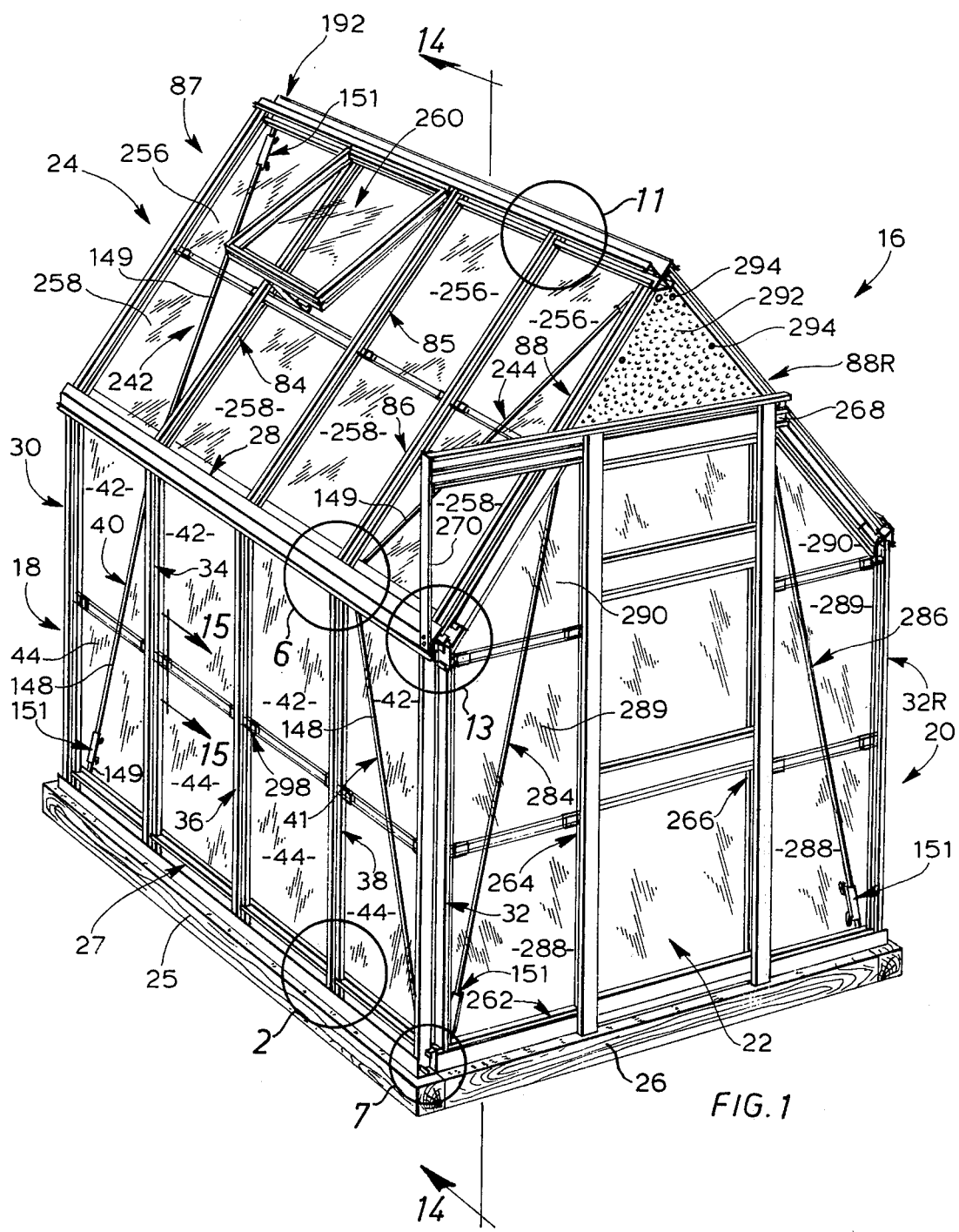
FIG. 1 is a somewhat simplifed perspective view of a greenhouse constructed in accordance with the teachings of this invention.

The greenhouse 16 shown in FIG. 1 also comprises two sloping roof sections, one of which is generally indicated at 24 and the other of which is not shown in FIG. 1 to facilitate comprehension of that figure.

The greenhouse 16 is shown in FIG. 1 as being mounted on a wooden frame foundation including side footings 25 and end footings 26. Since such foundation forms no part of this invention, it is omitted from most figures of the drawings.

The construction of the side wall 18 will now be described in greater detail. That side wall comprises a frame structure which is in turn formed from a side base sill or rail generally indicated at 27, an eaves rail generally indicated at 28, a rear corner post generally indicated at 30, a front corner post generally indicated at 32, and three identical upright posts or cross members generally indicated at 34, 36 and 38. The component frame members of the side wall 18 are maintained in their assembled configuration by first and second, generally diagonally extending bracing rod assemblies generally indicated at 40 and 41 respectively in a manner yet to be explained and the spaces between the various posts are glazed with upper glass panes 42 and lower glass panes 44 which are omitted from several figures of the drawings.

From FIGS. 2 to 5, it will be seen that the side base rail 27 is in the form of an elongated extrusion having a wall or web 46 which is integrally formed with an inner ór upper flange 48 projecting transversely outwardly relative to the side wall 18 and a wider transversely outwardly projecting or lower flange 50. At this point, it should perhaps be noted that, when reference is made herein to the "longitudinal direction" of an elongated frame member, such reference is intended to denote the direction of elongation of such member. For example, the longitudinal direction of the base rail is considered to be as indicated by the arrow A in FIG. 2.

Additionally, when reference is made herein to "inner" and "outer" flanges of an elongated member forming part of a frame, the adjective "inner" is considered to denote the flange which is inwardly disposed on the elongated member relative to the centre of such frame. Similarly, the "outer flange" is intended to denote that flange which is disposed outwardly relative to such frame. When it is intended to indicate parts which are disposed inwardly or outwardly relative to the inside of the greenhouse 16, the restriction that such parts are "transversely" inwardly or outwardly disposed (relative to a frame structure) will apply.

Referring now in further detail to the construction of the base rail 27, it is to be noted that it can be formed from any suitable material but that the use of an aluminum alloy for the manufacture of such rail and for the manufacture of other structural frame members of the greenhouse 16 is particularly advantageous.

The upper flange 48 of the base rail 27 is integrally formed transversely outwardly relative to the web 46 with a downwardly depending lip 52 while a reinforcing flange 54 projects transversely inwardly relative to the web 46. The lower flange 50 is integrally formed with a longitudinally extending and upwardly projecting lip 56 and an upstanding wall 58 is integrally formed with the lower flange at its transverse outermost edge. The upper edge of the wall 58 slopes slightly transversely outwardly and upwardly as indicated at 60 for a reason yet to be explained.

The upright post 38 comprises a base web 62 and integrally and centrally formed therewith a flange 64 which projects transversely outwardly relative to the base web 62. On opposite side of the flange 64, the post 38 is formed with reinforcing box section structures generally indicated at 65 and 66 and each defined by edge webs 67 and flanges 68 spaced apart from the base web 62. It is to be noted that the flanges 68 have longitudinal edges 70 which are spaced slightly from the central flange 64. Glazing strip channels 72 are provided on the flanges 68 to receive elongated glazing gaskets 74 of rubber or other resilient material, the structure of which will be readily apparent on inspection of FIGS. 2, 3 and 4. It should be noted that two such gaskets 74 are shown in FIG. 4 while only one is shown in each of FIGS. 2 and 3.

For a reason yet to be explained, longitudinally extending lips 76 which project transversely inwardly toward the base web 62 are provided on the sides of the transverse outer edge of the flange 64 to define recesses 77 while transversely outwardly facing recesses 78 defined by lips 79 are provided at the transverse inner end of the flange 64.

Figure 2:
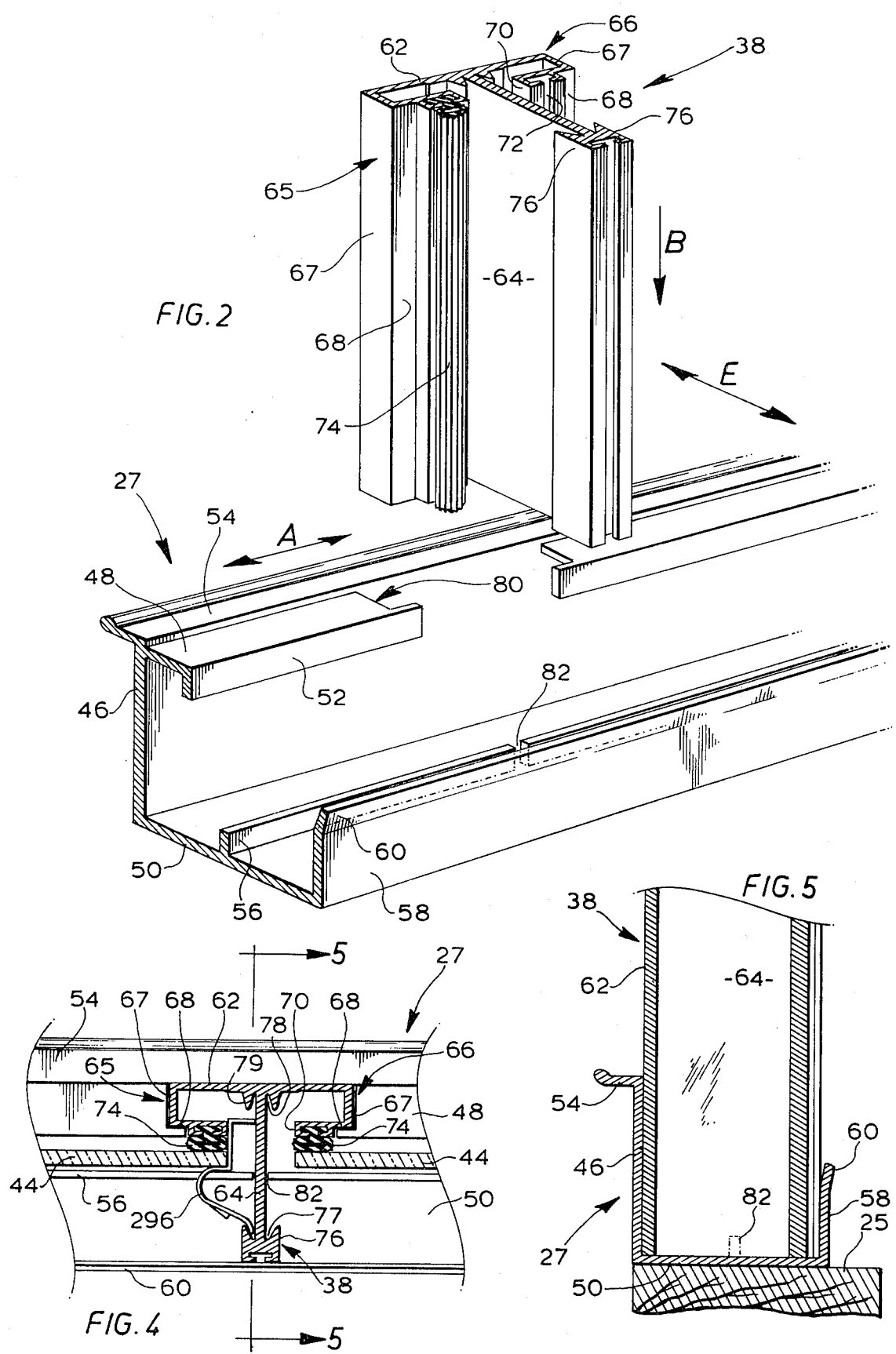
FIG. 2 is an exploded and fragmentary perspective view showing an upright post and a side base rail of the greenhouse shown in FIG. 1 at the position indicated at 2 in that figure.
Figure 3:
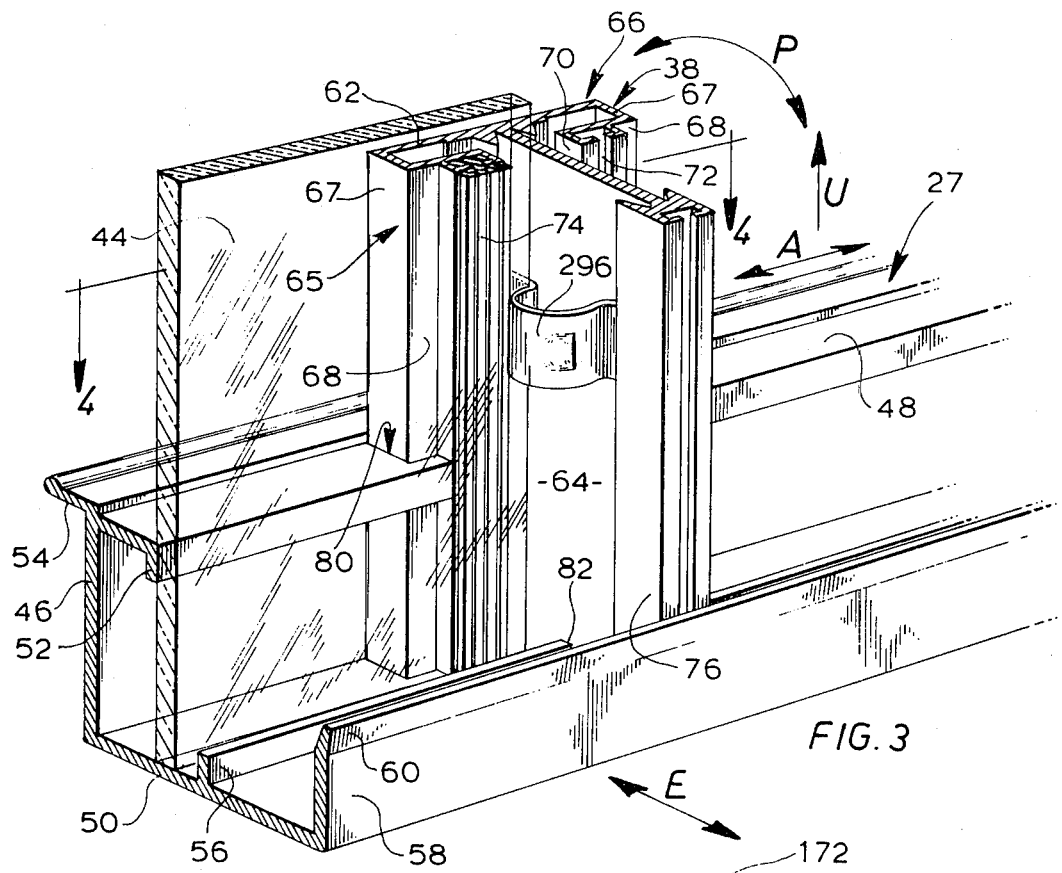
FIG. 3 is a fragmentary perspective view similar to that of FIG. 2 but showing the post and side base rail in their assembled configuration.

For assembly of the base rail 27 and the upright post 38, the upper flange 48 of the base rail is cut away as indicated generally at 80 in FIG. 2 while a notch 82 is cut in the upstanding lip 56 as also shown in FIG. 2. The lower end of the post 38 is then inserted downwardly as indicated by the arrow B (FIG. 2) through the opening 80 until that lower end of the post 38 abuts the lower flange 50 of the base rail 27 with the flange 64 of the post 38 entering the aforementioned notch 82 in the lip 56 as shown in FIGS. 3, 4 and 5. Such insertion of the lower end of the post 38 is facilitated by the sloping upper edge 60 on the front wall 58 of the base rail 27. It is also to be noted that the flange 54 serves to strengthen the base rail 27 at the opening 80.

Before explaining the results obtained by the hereinbefore described interfitting of the post 38 with the base rail 27, the construction of the eaves rail 28 and the manner in which the post 38 interfits with that eaves rail 28 will be described with references to FIG. 6 of the accompanying drawings.

The eaves rail 28, shown as being in the form of an elongated extrusion, can broadly be considered as effectively comprising two of the base rails 27 in angularly oriented back-to-back disposition so to permit its interfitting with the upright posts 34, 36 and 38 as well as with roof bars generally indicated at 84, 85 and 86 and with gable rail assemblies generally indicated at 87 and 88.

From FIG. 6, it will be seen that the eaves rail 28 comprises an elongated first web 90 and integrally formed therewith and angularly disposed thereto an elongated second web 92. The web 90 is integrally formed with a transversely outwardly extending central web generally indicated at 94 and which is in turn integrally formed at its transverse outer edge with both a downwardly projecting flange 96 and an upwardly sloping flange 98 which is generally parallel to the aforementioned second web 92.

Referring now in greater detail to the lower part of the eaves rail 28 as essentially defined by the web 94, the first web 90 and the flange 96, it will be seen that the web 90 is integrally formed along its lower edge with a lower flange 100 which projects transversely outwardly relative to the web 90 and with a reinforcing flange 102 which projects transversely inwardly and upwardly relative to the first web 90. Along its transverse outer edge, the lower flange 100 is integrally formed with an upwardly projecting lip 104.

The web 94 comprises a first or transverse inner portion 106 which projects generally horizontally from the web 90 and upwardly sloping portions 108 and 110. An elongated lip 112 projects transversely inwardly from the flange 96 horizontally opposite the aforementioned first portion 106 of the web 94.

An elongated lip 114 is integrally formed with the web 94 and projects downwardly below the level of both the lip 112 and the horizontal portion 106 of the web 94.

For a reason yet to be explained, an elongated hinge sleeve 116 is integrally formed along the lower edge of the flange 96.

To assemble the post 38 with the eaves rail 28, the lower flange 100 of the latter is cut away to provide an opening 117 through which the upper end of the post 38 is inserted as indicated by the arrow C (FIG. 6), A notch 118 in the lip 114 as shown in phantom outline is provided for receiving the upper end of the flange 64 of the post 38 in the same manner as the lower end of that flange 64 was received in the notch 82 in the lip 56 of the lower side rail 27.

It will not be understood that, with reference to the frame structure of the side wall 18 of the greenhouse 16, the lower flange 100 of the eaves rail 28 constitutes an inner flange while the web portion 106 and the opposed lip 112 which are abutted by the top end of the post 38 effectively jointly constitute an outer flange of the top rail 28 of that side wall frame structure.

The posts 34 and 36 of the side wall 18 interfit with the base rail 27 and with the eaves rail 28 in a manner identical to the post 38. The side wall 18 also comprises the essentially identical corner posts 30 and 32 and reference will now be made to FIGS. 7, 8 and 14 for a description of the corner post 32 and the manner in which that post interfits with the base rail 27.

It will be seen from those particular figures that the corner post 32 comprises two essentially identical portions generally indicated at 120 and 122 and interconnected by a web 124. The section 120 comprises a base web 126 integrally formed with a flange 128 which projects transversely outwardly relative to that base web 126. On one side of the flange 128, the portion 120 is formed with a box section structure identical to the left-hand structure 65 shown in FIG. 2 as being provided on the post 38. Consequently, such box section structure is indicated by that same legend 65 in FIG. 7. Similarly, the flange 128 is formed along its free edge with a transversely inwardly projecting lip 130 defining a recess 132 corresponding respectively to one of the lips 76 and one of the recesses 77 provided on the post 38. On the opposite side of the flange 128, there is formed a flange 134.

To assemble the corner post 32 with the side base rail 27 and the eaves rail 28, an opening 136 is provided in the upper flange 48 of that base rail 27 and an opening 138 is provided in the lower flange 100 of the eaves rail 28 for receiving the bottom and top ends respectively of the portion 120 of the corner post 32. The lip 56 of the side base rail 27 is notched at 140 and the lip 114 of the eaves rail 28 is notched at 142 to receive the bottom and top ends respectively of the flange 128 of the corner post 32. It is to be noted at his juncture that the web 124 is cut away as indicated at 144 (FIG. 7) at its lower end to receive the web 46 and the flange 54 of the base rail 27 and as indicated at 146 at its upper end (FIG. 13) to receive the web 90 and the reinforcing flange 102 of the eaves rail 28.

The corner post 30 is essentially identical to the corner post 32 differing therefrom only in that one is a mirror image of the other. Consequently, they can both be cut from the same extrusion and are assembled with the base rail 27 and the eaves rail 28 in identical manners.

Referring again to FIG. 1, the description herein will now proceed with reference to the bracing rod assemblies 40 and 41. Each of those assemblies comprises upper and lower bracing rods 148 and 149 respectively which are interconnected by a length-adjusting mechanism generally indicated at 151. At their upper ends, the upper rods 148 are formed with hooks 152 which are received in openings 154 provided in the first web 90 of the eaves rail 28 as will readily be understood by reference to FIG. 6. Similarly, hooks 156 formed at the lower ends of the lower rods 149 are received in openings 158 provided in the web 46 of the base rail 27 as particularly shown in FIG. 7.

Figures 9, 10:
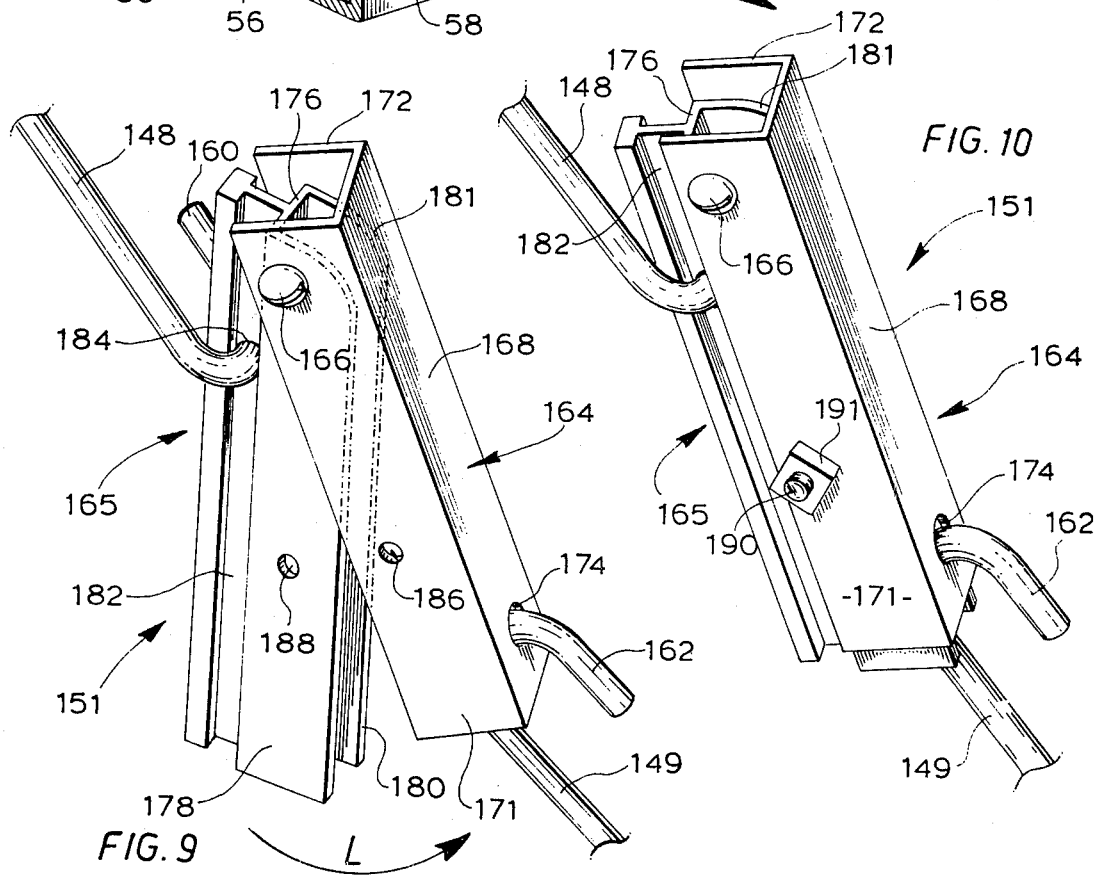
FIG. 9 is a perspective view of one length-adjusting or locking mechanism as provided in one bracing rod assembly of the greenhouse shown in FIG. 1, the locking mechanism being shown in its open or released position.
FIG. 10 is a perspective view similar to that of FIG. 9 but showing the locking mechanism in its closed or locked position.

The rods 148 and 149 are connected to the length-adjusting mechanism 151 by hooks 160 and 162 respectively formed on those rods (FIGS. 9 and 10).

Each length-adjusting mechaniam 151 comprises two parts generally indicated at 164 and 165 which are pivotally interconnected by a bolt 166. The first part 164 comprises a length of channel section having a web 168 and side flanges 171 and 172, the hook 162 on the upper end of the lower rod 149 extending outwardly through an opening 174 formed in the web 168. The second part 165 comprises a web 176 having on one side thereof flanges 178 and 189 which are freely received between the side flanges 171 and 172 of the first part 164 and, on its other side with a handle-forming I-section 182 provided with an opening 184 receiving the hook 160 on the lower end of the upper rod 148. Openings 186 and 188 are provided in the side flanges 171 and 172 of the first part 164 and in the flanges 178 and 180 of the second part 165 respectively for receiving a locking bolt 190 (FIG. 10) when the two parts 164 and 165 are moved as indicated by the arrow L from the open or released position shown in FIG. 9 to the closed position shown in FIG. 10. A nut 191 secures the bolt 190 in position. The ends of the flanges 178 and 180 are curved as indicated at 181 to permit the pivoting movement. It will now be understood that, when the length-adjusting mechanism 151 is moved from its released position to its closed position as already explained, the overall length of the respective one of the bracing rod assemblies 40 and 41 will be reduced to a unique predetermined value.

It should also be noted that the bracking rod assemblies 40 and 41 are mutually angularly disposed, the former extending upwardly and to the right in FIG. 1 and the latter extending upwardly and to the left in that same figure.

Having completed the description herein of the frame structure of the side wall 18 of the greenhouse 16, this description will now proceed with a brief explanation of the advantageous results obtained by the use of the described structure.

It will first be assumed that the base rail 27, the eaves rail 28, the corner posts 30 and 32 and the intermediate posts 34, 36 and 38 have been assembled in the manner hereinbefore described. As a result of such assembly, the upper ends of the corner posts 30 and 32 and the upper ends of the intermediate posts 34, 36 and 38 abut the first portion 106 of the web 94 and the aligned lip 112 on the eaves rail 28 and the lower ends of all those posts abut the lower flange 50 of the base rail 27. Such end abutment serves to prevent further movement of the base rail 27 and the eaves rail 28 toward each other as indicated by the arrows U and D in FIGS. 3 and 6 respectively.

Additionally, engagement of the corner posts 30 and 32 and of the intermediate posts 34, 36 and 38 with the material of the base rail 27 surrounding the openings 136 and 80 respectively in the flange 48 of the base rail 27 serves essentially to prevent movement of the lower ends of the posts both in the longitudinal directions of the base rail 27 as indicated by the arrow A (FIGS. 2 and 3) and in directions transverse to the principal plane of the side wall 18 as indicated by the arrows E in FIGS. 2 and 3.

At this stage, the side wall structure will still of course be free to pivot in its principal plane as indicated by the arrow P (FIG. 3). Such pivoting is, however, essentially prevented by the bracing rod assemblies 40 and 41. Those assemblies are first connected to the eaves rail 28 and to the base rail 27 as already described. The length-adjusting mechanisms 151 are then moved into their closed positions (FIG. 10) and locked in those positions using the bolts 190 so as to prevent such pivoting movement of the frame members of the side wall 18 as indicated by the arrow P and in fact to hold those frame members in a unique predetermined mutual angular orientation determined by the final lengths of the bracing rod assemblies 40 and 41. Normally, the final lengths of the bracing rod assemblies 40 and 41 will be such as to maintain all the posts perpendicular to the base and eaves rails 27 and 28 respectively.

The use of the length-adjusting mechanisms 151 which can be moved from released or open positions (FIG. 9) and into closed positions (FIG. 10) in which the bracing rod assemblies 40 and 41 have unique predetermined lengths is advantageous and preferred over the use of turnbuckles or other continuously adjustable length-adjusting mechanisms since they avoid the need for the person assembling the structure to ensure that he has correctly adjusted such mechanisms to obtain the desired mutual angular orientation, e.g. prependicular orientation, of the frame members. This is, of course, particularly important in the case of a greenhouse in which the angular orientation of the frame members is critical so as to permit glazing without undesirable stresses being applied to the panes.

In accordance with another preferred feature of the present invention, pivotal movement of the frame members as already mentioned and as indicated by the arrow P prior to attachment of the bracing rod assemblies 40 and 41 is substantially restricted by terminal engagement of the flanges 64 of the posts 34, 36 and 38 in the notches 82 and 118 in the lips 56 and 114 respectively of the base rail 27 and the eaves rail 28 respectively. This is of considerable advantage in facilitating assembly and erection of the greenhouse 16.

Having completed the description herein of the frame of the side wall 18 of the greenhouse 16, further reference will now be made to FIGS. 6, 13 and 14 as well as to FIG. 11 to describe the construction of the roof section 24. The frame structure of that roof section comprises the previously identified eaves rail 28, the roof bars 84, 85 and 86, the gable rail assemblies 87 and 88 and a ridge rail generally indicated at 192.

The roof bars 84, 85 and 86 are all identical and are cut from the same extrusion as are the upright posts 34, 36 and 38 already described herein. Consequently, the component parts of those roof bars are identified by the same legends.

From FIG. 6, it will be seen that the eaves rail 28 has a flange 194 projecting generally transversely outwardly relatively to the second web 92 thereof and reinforced along its transverse outer edge by a generally downwardly projecting lip 196. A flange 198 projects generally transversely inwardly from the upper edge of that flange 92 to reinforce that flange in the same manner as the flange 54 serves to reinforce the base rail 27 (FIG. 2).

The eaves rail 28 also comprises opposed lips 201 and 202 on the internal faces of the flanges 92 and 98 respectively for abutment by lower ends of the roof bars 84, 85 and 86 extending through openings 204 provided in the flange 194.

A flange 206 projects generally upwardly from the web 94 in the principal plane of the roof section 24 and is notched as indicated in phantom outline at 208 (FIG. 6) to receive the lower end of the flange 64 of a respective one of the roof bars 84, 85 and 86 and in turn to reduce relative pivotal movement of those roof bars and the eaves rail 28 prior to final locking of the roof section in its assembled configuration in a manner yet to be described. A generally transversely inwardly projecting lip 209 is usefully provided on the flange 206 for further abutment by the lower ends of the roof bars 84, 85 and 86.

Referring next to FIG. 11, it will be seen therefrom that the ridge rail 192 is in the form of an extrusion having a generally X-shaped transverse sectional configuration. The left-hand part of the ridge rail 192 comprises a web 212 which is integrally formed with an upper or outer flange 214 and a lower or inner flange 216 which is reinforced by a lip 218 and in which openings 220 are provided for receiving the upper ends of the roof bars 84, 85 and 86 so that, when assembled, the upper ends of those roof bars abut the flange 214. An elongated lip 222 projects generally downwardly and generally in the principal plane of the roof section 24 from the flange 214 and notches (not shown) are provided in that lip 222 opposite the openings 220 for terminally receiving the flanges 64 of respective ones of the roof bars 84, 85 and 86 to limit pivotal movement as indicated by the arrow Q in FIG. 6 and 11 during assembly of the roof.

An elongated hinge sleeve 224 is provided along the lower edge of a flange 226 projecting generally downwardly from the transverse outer edge of the upper flange 214. The right-hand part of the ridge rail 192 (FIG. 11) is essentially a mirror image of the left-hand part already described herein and serves the purpose of being the upper frame element of the right-hand sloping roof section. To avoid unnecessary duplication of the description herein, the component elements of that right-hand part of the ridge rail are identified by the same legends except that they have appended the suffix "R". It is also to be noted that a generally horizontal reinforcing web 228 extends between the lower edges of the webs 212 and 212R.

Figure 13:
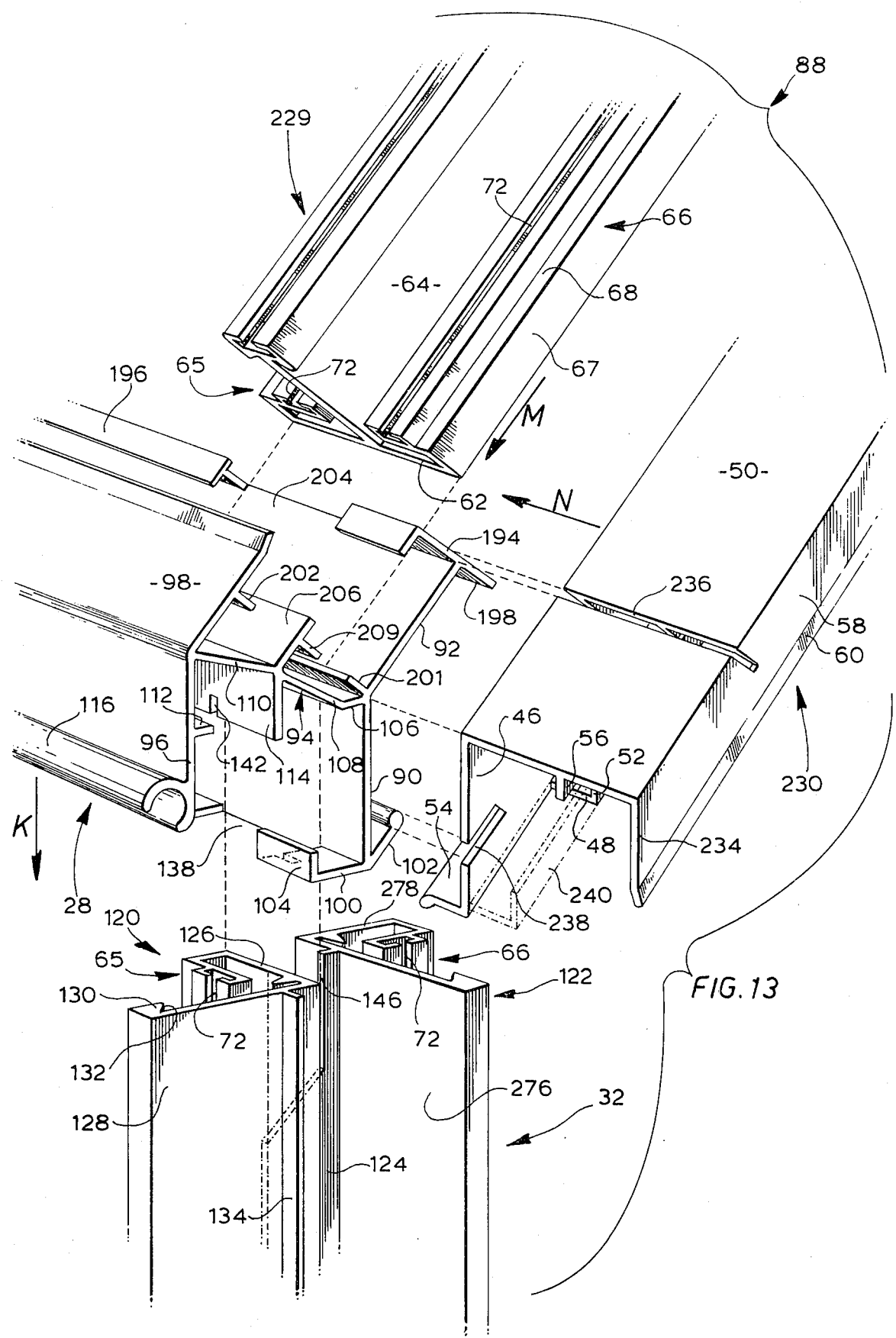
FIG. 13 is an exploded and fragmentary perspective view showing a corner post, an eaves rail and an end gable rail assembly of the greenhouse shown in FIG. 1 at the position indicated at 13 in that figure.
Figure 14:
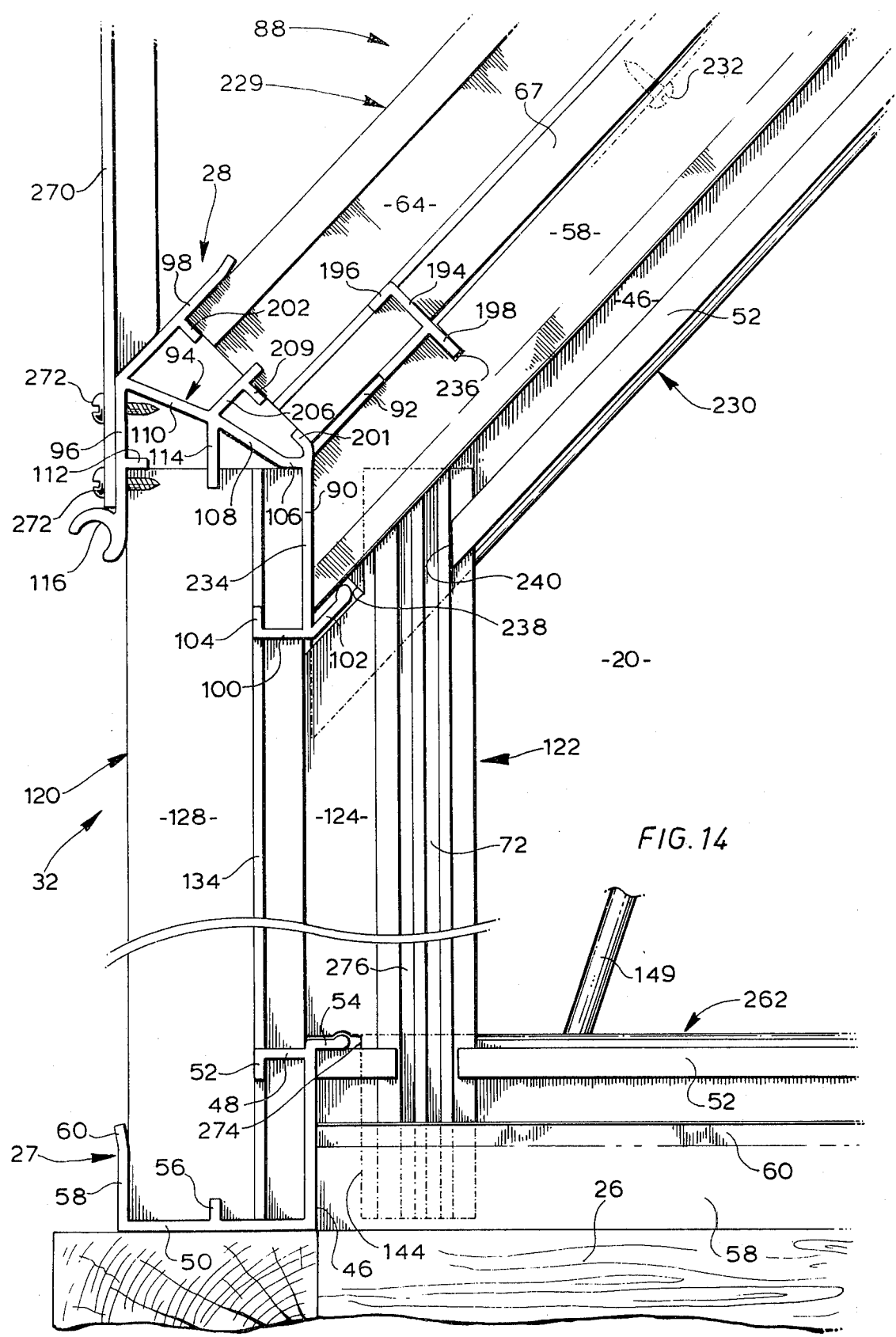
FIG. 14 is a fragmentary end elevation of the greenhouse shown in FIG. 1 when taken as indicated by the arrows 14—14 of that figure.

Referring now to FIGS. 13 and 14, it will be seen that the gable rail assembly 88 comprises two components, namely a roof bar generally indicated at 229 and identical to the intermediate roof bars 84, 85 and 86 and an elongated member generally indicated at 230 and having a cross-sectional configuration identical to that of the side base rail 27. Consequently, the legends already identified ar used to indicate the same component parts. The roof bar 229 interfits with the eaves rail 28 and with the ridge rail 192 in the same manner as do the roof bars 84, 85 and 86.

The elongated member 230 is secured to the roof bar 229 by self-tapping screws 232, one of which is shown in phantom outline in FIG. 14 and which extend upwardly through both the base web 50 of the elongated member 230 and the base web 62 of the roof bar 229.

At its lower end, the elongated member 230 is mitred as at 234 so as terminally to abut the web 90 of the eaves rail 28 while a slot 236 is cut in the base flange 50 of the elongated member 230 to receive the flange 198 of the eaves rail 28. Additionally, a slot 238 is cut in the lower end of the web 46 of the elongated member 230 to receive the reinforcing flange 102 of the eaves rail 28. The flange 48 and the reinforcing lip 52 of the elongaged member 230 are cut back at their lower end as indicated at 240 to accommodate the upper end of the portion 122 of the corner post 32 as will be understood by reference to FIGS. 13 and 14. At its upper end, the elongated member 230 is mitred to provide a vertical end (not shown) which is disposed centrally below the ridge rail 192.

The gable rail assembly 87 is essentially identical to the assembly 88 and will not, therefore, be separately described herein.

Having assembled the eaves rail 28, the ridge rail 192, the roof bars 84, 85 and 86 and the gable rail assemblies 87 and 88 in the manner already described, they are maintained in such assembled configuration and in a unique predetermined mutual angular orientation by mutually angularly oriented first and second bracing rod assemblies generally indicated at 242 and 244 respectively and essentially identical to the assemblies 40 and 41 already described herein; identical components of such structures are, therefore, identified by the same legends. The hooks 156 provided at the lower ends of the lower rods 149 of the assemblies 242 and 244 extend through openings 246 (FIG. 6) in the eaves rail 28 while the hooks 152 at the upper ends of the upper bars 148 of the assemblies 242 and 244 are received in openings 248 provided in the vertical flanges 249 of brackets generally indicated at 250 and secured to the flange 228 of the ridge rail 192 at each end thereof by screws 252 passing upwardly through horizontal flanges 254 of those brackets 250.

Since the right-hand sloping roof section is identical to the left-hand roof section 24, the parts thereof are identified in the accompanying drawings with the same legends except that the suffix "R" is added.

In FIG. 1, the space between the gable rail assembly 87 and the roof bar 84 and the spaces between the roof bar 85 and the gable rail assembly 88 are shown as being glazed with upper glass panes 256 and lower glass panes 258. The space between the roof bars 84 and 85 is shown as being glazed with a lower glass pane 258 and as being provided above that pane with a hinged glazed vent generally indicated at 260. Since the construction of the vent 260 forms no part of the present invention, it will not be described further herein other than to indicate that its hinged mounting can be effected using the hinge sleeve 224 provided on the ridge rail 192. It is also to be noted that the provision of the hinge sleeve 116 along the eaves rail 28 permits the provision of a similar hinged vent in the side wall 18.

Finally, reference will be made to the construction of the front end wall 20. It will be noted that that wall 20 is framed by the left-hand corner post 32 (FIG. 1), by the corresponding right-hand corner post generally indicated at 32R, by an end base rail generally indicated at 262 and cut from the same extrusion as the side base rail 27, and by the gable rail assemblies 88 and 88R. The end wall 20 also comprises two upright posts generally indicated at 264 and 266, which are cut from the same extrusion as the upright posts 34, 36 and 38 already described and which define a doorway which can be closed by the door 22 which is mounted on a overhead rail 268 supported at its left-hand end (FIG. 1) at the top of an arm 270 secured by screws 272 (FIG. 14) to the eaves rail 28. The door 22 is provided at its lower edge with guide means (not shown) which interengage with the end base rail 262. Since the door 22 and its mounting form no part of this invention, they will not be described in greater detail herein. It can, however, be noted that rubber sealing strips 273 (FIG. 16) are usefully provided on the posts 264 and 266 to provide a degree of weather sealing along the sides of the door 22.

Further reference will now be made to FIGS. 6, 7, 8, 13 and 14 to continue the description of the construction of the corner post 32 and of the manner in which that post fits together with the side and end base rails 27 and 262 respectively and with the eaves rail 28 and the gable rail assembly 88.

Figure 7:
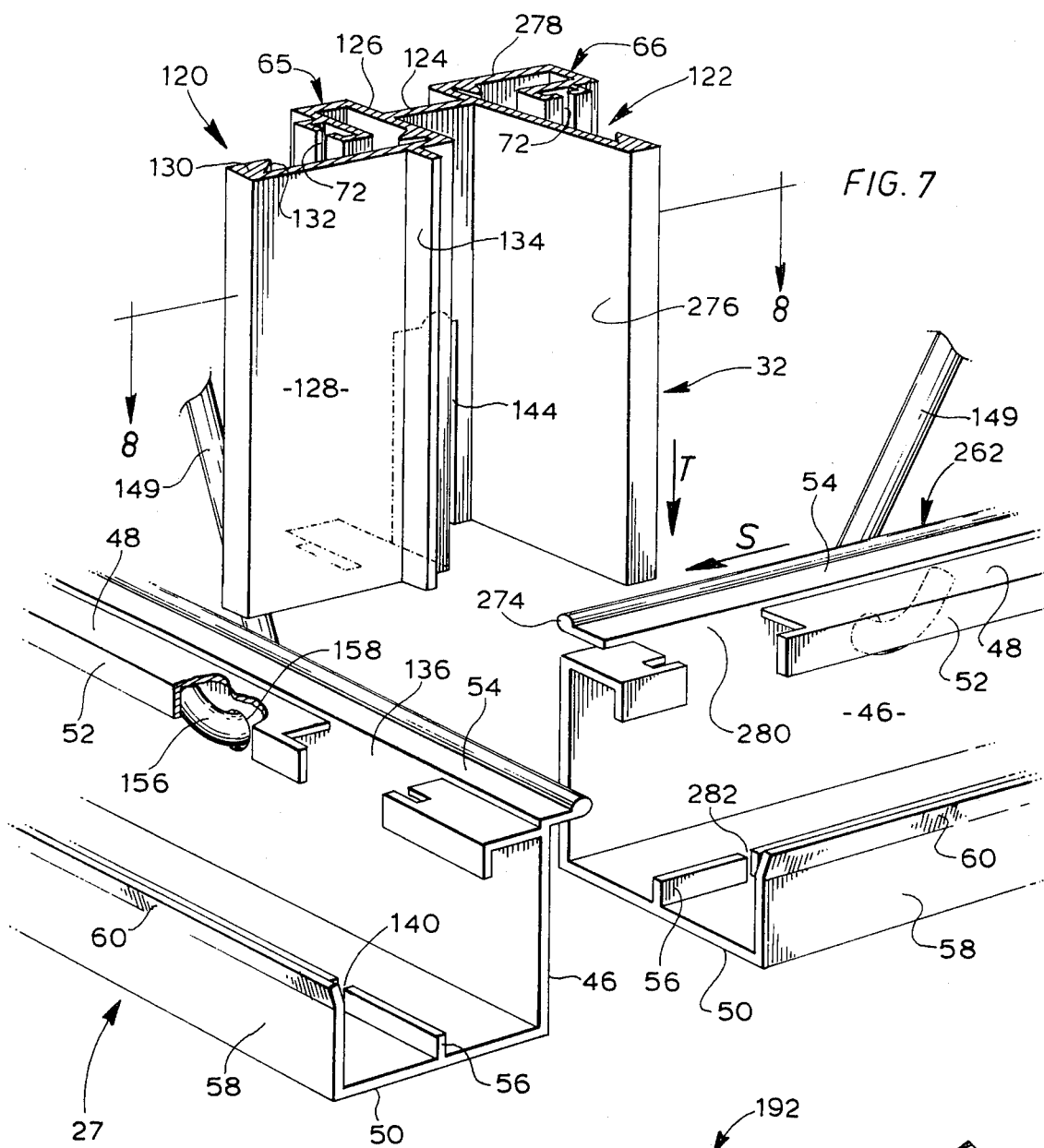
FIG. 7 is an exploded and fragmentary perspective view showing a side base rail, an end base rail and a corner post of the greenhouse shown in FIG. 1 at the position indicated at 7 in that figure.
Figure 12:
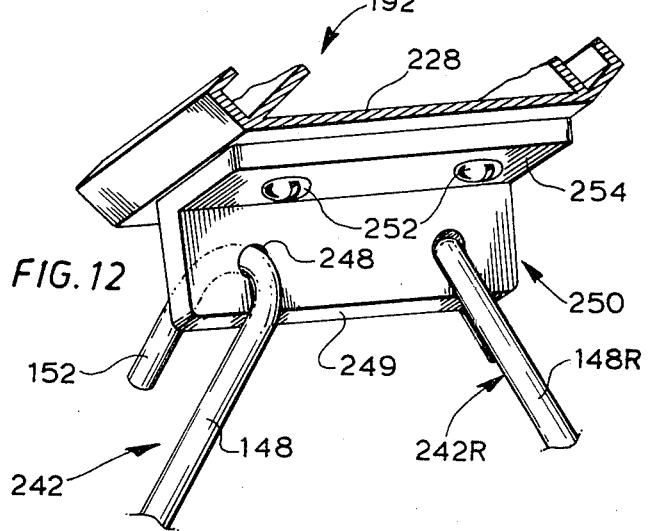
FIG. 12 is a fragmentary perspective view showing the manner in which certain bracing rods are terminally anchored to the ridge rail of the greenhouse shown in FIG. 1.

From FIGS. 7, 8 and 14, it will be seen that the reinforcing flange 54 of the end base rail 262 is cut back as indicated at 274 to allow the end of the end base rail 262 to abut the wall 46 of the side base rail 27 with the flange 54 of the latter rail 27 being disposed over the end of the flange 48 of the end base rail 262 as best shown in FIG. 14.

The right-hand portion 122 of the corner post 32 comprises a flange 276, a base web 278 and a box section structure 66. An opening 180 is provided in the flange 48 of the end base rail 262 for receiving the structure 66 of the right-hand portion 122 of the corner post 32 while a notch 282 is provided in the lip 56 of the end base rail 262 to receive the end of the flange 276 of the corner post 32 to limit pivotal movement of the corner post 32 relative to the end base rail 262 in a manner identical to that used in the side wall 18 as already described.

It will now be understood that, when the end base rail 262 is first moved as indicated by the arrow S (FIG. 7) into end abutment with the wall 46 of the side base rail 27 and the corner post 32 is then moved downwardly as indicated by the arrow T (FIG. 7) with the box section structures 65 and 66 of that corner post 32 being received in the openings 136 and 280 in those base rails, the corner post 32 and those base rails 27 and 262 are as a result effectively locked in their assembled positions.

Referring now to FIGS. 13 and 14, it will be seen that assembly of the corner post 32, the eaves rail 28 and the gable rail assembly 88 is effected by first moving the roof bar 229 downwardly as indicated by the arrow M into the opening 204 until the lower end of that bar 229 abuts the lips 201, 202 and 209. The elongated member 230 is then moved rearwardly as indicated by the arrow N with the flange 198 of the eaves rail 28 being received in the slot 236 in the elongated member 230 and with the reinforcing flange 102 of the eaves rail 28 being received in the slot 238 in the web 46 of the elongated member 230. The screws 232 (FIG. 14) are then inserted to secure the elongated member 230 to the roof bar 229. The resulting assembly is then lowered as indicated by the arrow K (FIG. 13) so that the box section structure 65 of the left-hand portion 120 of the corner post 32 is received in the opening 138 in the eaves rail 28 and so that the upper end of the flange 128 of the corner post 32 is received in the notch 142, the box section structure 66 of the right-hand portion 122 of the corner post 32 being accommodated by the terminally cut away portion 240 of the elongated member 230.

Assembly of the front end wall 20 is completed by the fitting of first and second bracing rod assemblies generally indicated at 284 and 286 respectively, which are essentially identical to but somewhat longer than the assemblies 40 and 41 already described. Those assemblies are connected at their lower ends to the end base rail 262 and at their upper ends to the elongated members 230 of the gable rail assemblies 88 and 88R respectively. The length-adjusting mechanisms 151 provided in the bracing rod assemblies 284 and 286 are then moved into their closed positions and locked in those positions to complete the frame assembly of the front end wall 20 and to lock that wall into a unique predetermined angular orientation.

It will be seen from FIG. 1 that the end wall is glazed on each side of the door 22 by lower glass panes 288, intermediate glass panes 289 and upper triangular panes 290. Above the door 22, the end wall 20 is closed by a triangular metal panel 292 secured by screws 294 to the gable rail assemblies 88 and 88R.

The manner in which the greenhouse 16 is glazed will now be considered briefly. To effect such glazing, the glazing gaskets 74 are first inserted in the channels 72 provided on the upright posts, the corner posts and the roofing bars. Considering the side wall 18, by way of example, the lower panes 44 are placed and held in position by the use of spring metal glazing clips 296 as shown in FIGS. 3 and 4 and which press the pane 44 firmly against the gaskets 74. Pane-supporting clips 298 (FIG. 15) are then positioned on the top edge of the lower pane 44 and the lower edge of the upper pane 42 is then inserted into such clips and supported thereby. Additional glazing clips 296 are then fitted to retain the upper panes 42 in position.

What is claimed is:

1. A building structure comprising a first elongated and essentially rigid rail comprising a web and integrally fromed therewith inner and outer flanges projecting transversely from said web, a second elongated and essentially rigid rail generally parallel to said first rail, mutually spaced apart therefrom in a first principal plane containing said web of said first rail and in turn comprising: a first web disposed in said first principal plane; first inner and outer flanges integrally formed with said first web and projecting transversely therefrom; a second web integrally formed with said first web and disposed in a second principal plane angularly disposed with respect to said first principal plane; and second inner and outer flanges integrally formed with said second web and projecting transversely therefrom;

a third elongate and essentially rigid rail generally parallel to said second rail, spaced apart therefrom in said second principal plane and in turn comprising a web disposed in said second principal plane and integrally formed therewith inner and outer flanges projecting transversely from said web;

a first pair of elongated, mutually spaced and essentially rigid cross members each comprising a base and extending between said first and second rails generally in said first principal plane and being slidably received in rectangular openings provided in said inner flange of said first rail and in said first inner flange of said second rail and terminally abutting said outer flange of said first rail and said first outer flange of said second rail so as essentially to prevent movement of said first and second rails toward each other and movement of the ends of said cross members of said first pair both in the longitudinal direction of said first and second rails and transversely relative to said first principal plane;

a second pair of elongated, mutually spaced and essentially rigid cross members each comprising a base and extending between said second and third rails generally in said second principal plane and being slidably received in openings provided in said inner flange of said third rail and in said second inner flange of said second rail and terminally abutting said outer flange of said third rail and said second outer flange of said second and third rails toward each other and movement of the ends of said cross members of said second pair both in the longitudinal direction of said second and third rails and transversely relative to said second principal plane;

two generally diagonally extending bracing members mutually angularly disposed and terminally interconnecting said first and second rails to maintain those rails and said first pair of cross members in interfitting assembled configuration in a predetermined angular orientation;

two generally diagonally extending bracing members mutually angularly disposed and terminally interconnecting said second and third rails to maintain those rails and said second pair of cross members in interfitting assembled configuration in a predetermined angular orientation;

each said bracing member including a length-adjusting mechanism whereby, after assembly of said rails, said cross members and said bracing members, the lengths of said bracing members can be reduced by operation of said length-adjusting mechanism for adjusting and maintaining said rails and cross members in said predetermined angular orientations;

each said cross member also comprising a flange extending from said base thereof relative to a respective one of said first and second principal planes, and terminally received in aligned notches provided in longitudinally extending lips provided on respective ones of said rails and projecting inwardly of said outer flanges of respective ones of said rails so as to restrict relative pivotal movement of said rails and said cross members in respective ones of said first and second principal planes prior to connection of said bracing members to sail rails.

2. A building structure as claimed in claim 1 including glass panes disposed and secured between said rails and said cross members.

3. A building structure comprising
a pair of elongated, spaced, parallel rigid rails,
at least two elongated, spaced, parallel rigid cross members extending terminally and longitudinally between and slidably engageable with said rails to form therewith at least one generally planar frame having a principal plane,
each said cross member having a base portion having a substantially rectangular cross section and disposed generally in said principal plane, and a central flange projecting from said base portion normal to said principal plane,
each said rail having a web disposed generally in said principal plane and parallel spaced inner and outer flanges projecting from said web and extending normal to said principal plane,
at least two rectangular openings formed in said inner flange, said rectangular openings having a configuration and dimension equal to the cross section configuration and dimension of the base portion of said cross members and being adapted to receive end portions of said cross members to be slidably inserted therethrough for interfitting engagement with said rails,
an upstanding ridge formed on said outer flange,
at least two notches formed in said ridge, each notch being positioned in registry with said rectangular openings in said inner flange, said notches being adapted to engage with the terminal end of the central flange of said cross members when said cross members and said rails are in said interfitted engagement,
at least one bracing member terminally connected to said rails and operative to draw said rails towards each other so as to retain said rails and said cross members securely in their interfitted engagement.

4. A building structure according to claim 3 wherein each said cross member abuts and additionally interfits with each said rail at a position longitudinally offset along said cross member relative to a respective one of said rectangular openings in said rails so as to restrict relative pivotal movement of said rails and said cross members in said plane prior to connection of said bracing member to said rails.

5. A building structure according to claim 4 wherein said bracing member comprises a length-adjusting mechanism having a channel section and a web member hingedly connected at one end thereof, said web member being receivable within said channel section when said mechanism is in a closed or locked position, a first elongated rod having one end connected to said web member at a location close to the hinge, a second elongated rod having one end connected to said channel section at the distal end from the hinge, the other end of said first and second rods being respectively connected to one of said rails, a first opening formed in said web member, a second opening formed in said channel section, said first and second openings being aligned with each other when said mechanism is in the closed or locked position, locking means removably locatable in said aligned openings to retain said mechanism in said closed or locked position.

6. A building structure according to claim 5 wherein said locking means comprises a bolt disposed in said aligned openings and a nut fastened to said bolt to retain said bolt mounted fixedly on said mechanism.

7. A building structure according to claim 6 wherein each said cross member had longitudinally extending lips projecting transversely inwardly from both sides of the outer edge of said central flange toward the base, and glazing mounting edges provided on said base and located on both sides of said central flange.

8. A building structure according to claim 7 including at least one panel disposed in said frame, said panel being juxtaposed to said glazing mounting edges of the cross members and being removably retained in place by resilient clip elements mounted between said panel and said longitudinally extending lips of the central flange of the cross members.

9. A building structure according to claim 8 wherein said panel is of glass.

10. A building structure according claim 3 which comprises two bracing members extending generally diagonally of said frame and mutually angularly disposed relative to each other.

11. A building structure according to claim 10 wherein said bracing members are disposed so as to be subjected to tensile stress in preventing relative pivotal movement of said rails and said cross members out of a predetermined mutual angular orientation in said principal plane of said frame.

* * * * *